United States Patent [19]
Jackson et al.

[11] Patent Number: 6,052,779
[45] Date of Patent: Apr. 18, 2000

[54] AUTOMATIC WAKE-UP OF SYSTEMS IN A DATA PROCESSING NETWORK

[75] Inventors: Frederick Samuel Jackson, Strathclyde; Richard Ian Knox, Bridge of Weir; Colin David McCall, Strathclyde, all of United Kingdom

[73] Assignee: International Business Machines Corporation, Armonk, N.Y.

[21] Appl. No.: 09/005,378

[22] Filed: Jan. 9, 1998

[30] Foreign Application Priority Data

Aug. 8, 1997 [GB] United Kingdom .................. 9716796

[51] Int. Cl.$^7$ ..................................... G06F 9/445
[52] U.S. Cl. ............................................... 713/2
[58] Field of Search ........................ 713/2; 709/203, 709/222

[56] References Cited

U.S. PATENT DOCUMENTS

| | | | |
|---|---|---|---|
| 5,280,627 | 1/1994 | Flaherty et al. | 713/2 |
| 5,367,688 | 11/1994 | Croll | 713/2 |
| 5,444,850 | 8/1995 | Chang | 709/222 |
| 5,577,210 | 11/1996 | Abdous et al. | 709/222 X |
| 5,675,800 | 10/1997 | Fisher, Jr. et al. | 713/2 |
| 5,872,968 | 2/1999 | Knox et al. | 713/2 |

*Primary Examiner*—Thomas M. Heckler
*Attorney, Agent, or Firm*—Edward H. Duffield

[57] ABSTRACT

A data processing network comprises a plurality of client systems and a controlling system operable to issue wake-up requests to the client systems to cause the client systems to issue boot requests onto the network for servicing by a connected server system. The controlling system, which may be embodied in the server system or in a separate system issues the wake-up requests in accordance with a wake-up schedule calculated, for each client, to complete the boot process for that client before a target start-up time when a client user wishes to use the client system.

12 Claims, 5 Drawing Sheets

AUTOMATIC WAKE-UP OF SYSTEMS IN A DATA PROCESSING NETWORK

FIELD OF THE INVENTION

The present invention relates to a data processing network of the type in which a plurality of client computer systems are connected to a server computer system.

BACKGROUND OF THE INVENTION

In a typical network environment, multiple client computer systems (clients) are connected to one or more server computer systems (servers). In a first common arrangement, each client system includes an operating system, and optionally other software, stored on a mass storage device such as a hard disk drive within the client. On power-up or reboot, the client boots from the hard disk drive without reference to the server computer ('local boot'). Other application software e.g. word processing, database software etc, which may be held on local storage or on remote storage associated with the server, is accessed as needed by the client.

In an alternative network configuration, the client computer is required to boot from the server (so-called remote boot). The client may or may not include a mass storage device such as a hard disk drive. In the latter case, the client is reliant on the server to provide operating system and other software. Consequently, when such a client system is powered-up or rebooted, the client fetches its operating system software from the server system and stores the software in volatile memory for use until the client system is powered-off.

A network of the remote-boot type in which each client system boots from a remote server system has an advantage over the 'local boot' network in that the network administrator has full control over the software downloaded to the client for storage in volatile memory. In this manner, the network administrator is able to control the operation and configuration of all the client systems with one consequence that the client users can be prevented from installing and using undesirable and/or unlicensed software on their client systems. Furthermore, in this type of network, the overall equipment costs are reduced by the cost of a hard disk drive for each client. The overall network operating costs are thus typically seen to be lower than the costs of a local boot network.

However, a remote-boot network has a number of disadvantages, not the least of which is high network loading caused when a large number of clients attempt to boot at approximately the same time, as would happen for example at the start of the working day. This overloading causes general disruption and reduced efficiency (especially in large network environments) and more particularly results in a delay in the loading of software images to the client systems thereby delaying the time from which the client systems become operational.

One way in which this problem can be reduced is to provide a higher ratio of server to client systems. However, an increase in ratio would raise the overall equipment costs of the network thus largely negating the lower maintenance costs. Alternatively, the network could make use of broadcast protocols to transmit the same download information to all the clients. This technique would still require several minutes to boot the client computers and depends on all the clients requiring the same download software image, thus greatly reducing flexibility.

In view of the above, it would be a desirable objective to provide the means by which network loading can be reduced in a remote-boot network.

SUMMARY OF THE INVENTION

Accordingly, the present invention provides a data processing network comprising a plurality of client systems and a controlling system operable to issue wake-up requests to the client systems to cause the client systems to issue boot requests onto the network for servicing by a connected server system, the controlling system being operable to issue the wake-up requests in accordance with a wake-up schedule calculated, for each client, to complete the boot process for that client before a target start-up time when a client user wishes to use the client system.

The target start time is typically the start of the working day when the user of a particular client system normally wishes to begin using the client system. In a typical office environment, the target start times for the client systems will vary depending on the work habits of the individual user. By means of the present invention, the client systems are powered-up and operational before the individual normally wishes to begin using the client for tasks such as data entry, word processing etc.

As will be appreciated, such a technique allows for better load balancing on the network and avoids bottlenecks caused when multiple users power-on their systems at the same time of day.

In one embodiment, the controlling system comprises wake-up scheduling software executing on a network administrator console. The controlling system is preferably operable to automatically calculate the wake-up schedule based on a target start time and a typical boot time for each client system.

In one preferred arrangement, the controlling system is further operable to detect the successful completion of the boot process for each client and to dynamically alter the wake-up schedule for the client systems remaining to be woken up. Thus if a client completes earlier than expected then the controlling system can consider whether the wake-up schedule can be brought forward for the remaining clients. Similarly, if for some reason, the client completes later than expected, the wake-up schedule can be put back to avoid overloading of the network.

In a typical network, it is often necessary to add further client systems or to replace existing systems with new systems. In accordance with one embodiment of the invention, the controlling system is further operable on receipt of boot requests from a new client system not currently included in the wake-up schedule to compile data relating to the typical time that the client system issues a boot request and thereafter to add the new client system to the wake-up schedule with a target time prior to the typical time.

Preferred embodiments of the present invention will now be described, by way of example only, with reference to the accompanying drawings.

DETAILED DESCRIPTION OF THE PREFERRED EMBODIMENTS

Figure 1:
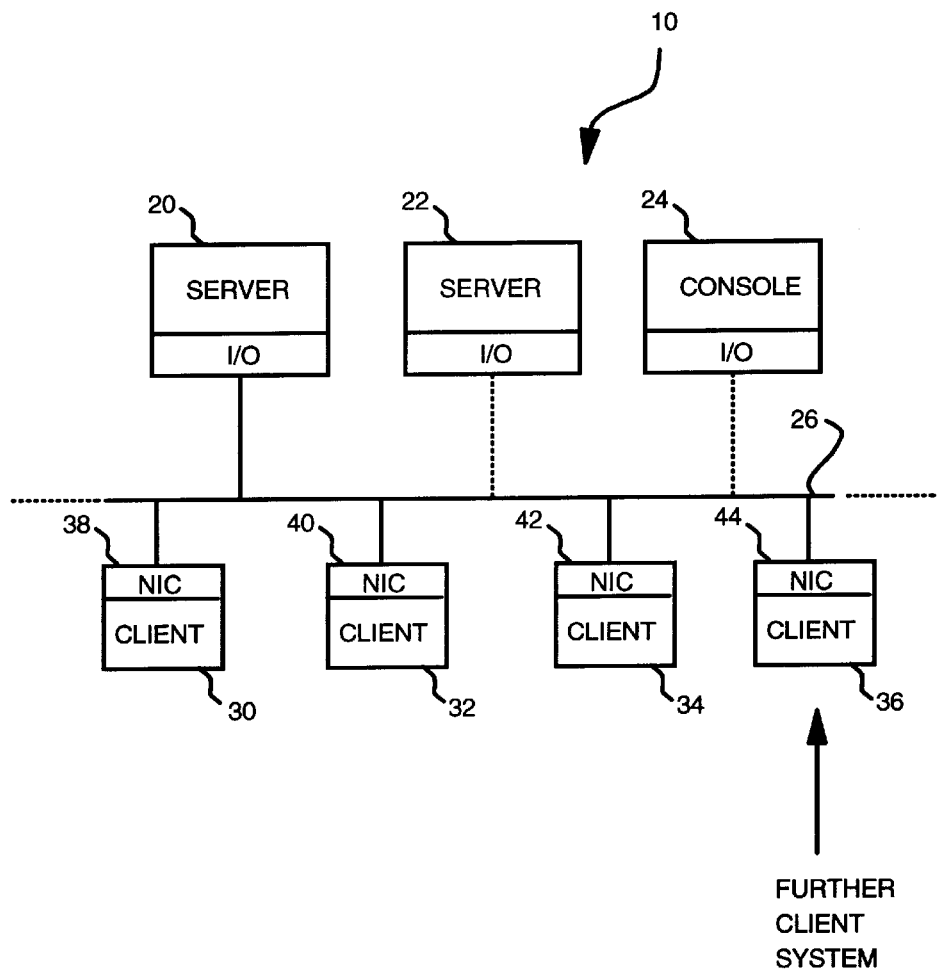
FIG. 1 is a schematic representation of a computer network according to a preferred embodiment of the present invention.

Referring firstly to FIG. 1, there is shown, in schematic form, a local area network (LAN) 10 in which a preferred embodiment of the invention is implemented. The network of FIG. 1, which may be constituted as an Ethernet or Token-ring LAN or other arrangement, comprises a server computer system 20 (which in the present embodiment may be an IBM PC 730 computer system connected for communication by a link 26, in a loop configuration, with a plurality of client computer systems 30, 32, 34 and further client system, 36. The client computer systems may be personal computers based on the Intel X86 family of microprocessors or other forms of computer system including the Network Station from IBM. Each client system includes a LAN adapter card or network interface card (NIC) 38, 40, 42, 44 to provide communication with the server computer over link 26. Optionally, the network includes one or more further server systems 22 and a console computer system 24 through which the network administrator controls the network. The console system will generally be similar to a client system except that it will include mass storage and further will be arranged to provide the network administrator with certain privileges, not available to a client user, which allows him/her to control the network.

Control of resources on the network including communication between server and clients is effected by means of a network operating system (NOS) e.g. OS/2 LAN Server from IBM Corporation having a 'server' component which executes on the main processor(s) of the server computer system and a corresponding 'requester' component which executes on the main processor of each client computer system. Other suitable network operating systems include Netware from Novell Inc and OS/2 WARP server from IBM.

Figure 2:
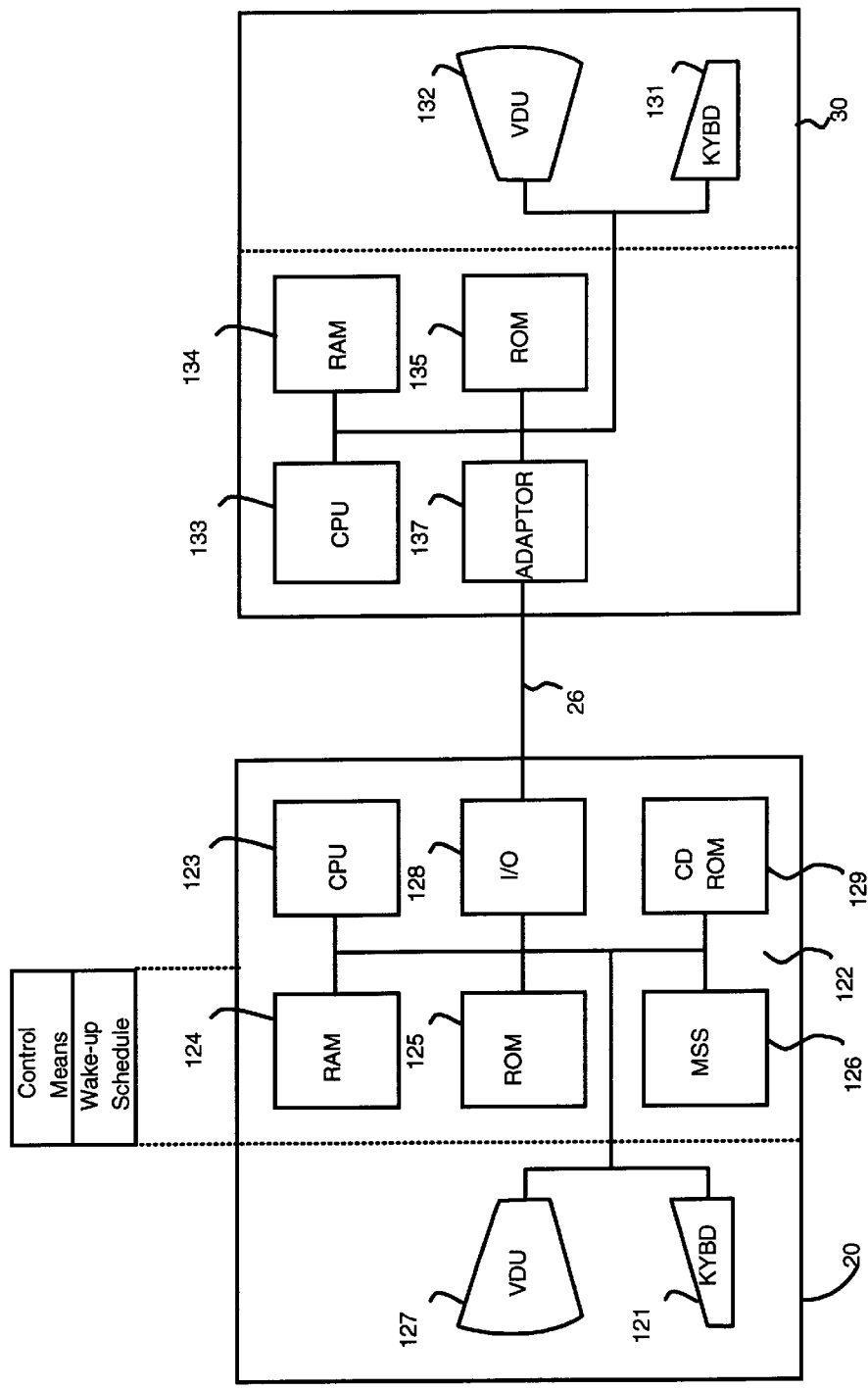
FIG. 2 is a block-diagrammatical representation of a client computer system connected to a server computer system in the network of FIG. 1.

FIG. 2 is a simplified block diagram showing the connection of server computer system 20 to client system 30 over communication link 26. As is normal, the client system, constituted in the present embodiment by a personal computer, includes a keyboard 131 and a display 132 operating under the control of control logic in the form of main CPU 133 which is connected by a system bus to system memory (RAM) 134 and non-volatile memory (ROM) 135, in which is stored system BIOS including POST code. The client system further includes a network adapter card 137 which, in the present embodiment, may be either an ethernet or token-ring adapter card. This adapter card includes non-volatile memory in the form of ROM in which is stored code employed in providing communication between the client and server.

It will be noted that the client system of the present embodiment is not provided with mass storage device(s) e.g. in the form of a magnetic disk drive (hard file). Furthermore, if it is desired to prevent the client user from introducing software or data into the client system, the client system is advantageously not provided with a diskette drive, CD-ROM drive or similar.

The server computer system of FIG. 2 includes a keyboard 121 attached to a system unit 122 including a main CPU 123, system RAM 124, system ROM 125 and mass storage capability 126, typically in the form of multiple magnetic disk drives constituted in a RAID (redundant array of independent disks) arrangement. Stored on the disk drives is a variety of different software including operating system software and application software for downloading to, and use by, the client systems. The server system may optionally include a display 127 (if the network administrator requires direct interaction with the server system) and other storage devices such as a diskette drive (not shown) and CD-ROM drive 129. Communication over the link 26 is provided by input/output logic 128 which may take the form of an adapter card.

Although the client systems described above do not include a mass storage device, the present invention is also useful with client systems including non-volatile storage such as a hard file or similar for the local storage of operating system and other software. This type of client system is also forced to request initial program load from an attached server. The server is configured to respond to such a request to cause the client to carry out a local program load or alternatively to cause the client to download software from the server for storage on the client hard file. Such an arrangement is described in co-pending UK patent application GB9605670.

Figure 3:
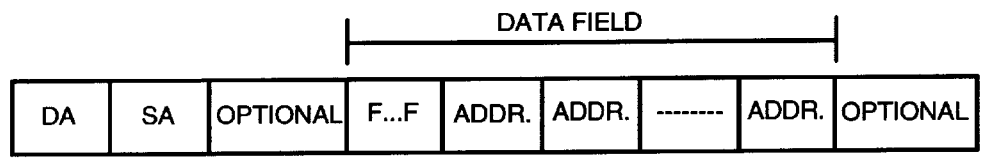
FIG. 3 shows the format of wake-up frame employed in the embodiment of the present invention.

The present embodiment makes use of the so-called 'Wake-on-LAN' technology developed by IBM and Intel which is designed to allow a server to wake-up a suitably enabled client system which is powered-off. In order to allow the client to be woken-up, the network adapter card in the client is Wake-on-LAN enabled in that, even when the client is turned off, the adapter card is supplied with power from the system power supply. Wake-on-LAN further defines a wake-up frame which is sent from the server to the client. The format of the wake-up frame is shown in FIG. 3 and comprises the following fields:

DA Destination Address: this can be the specific address of a client system or can be a broadcast address;

SA Source Address: identifies the server sending the frame;

Optional may include IP header;

F.F 6 bytes of FFhex for hardware sync, byte aligned;

Addr Media Access Control (MAC) address repeated consecutively 16 times

On receipt of a wake-up frame from the attached server, the adapter analyzes it to determine whether the frame contains the clients media access control (MAC) address. If the frame contains the MAC address, the wake-up control function on the client mainboard signals the power supply to turn the client on, just as if the power switch had been turned on. Further details of the Wake-on-LAN technology and its uses can be found in a white paper published by IBM.

Figure 4:
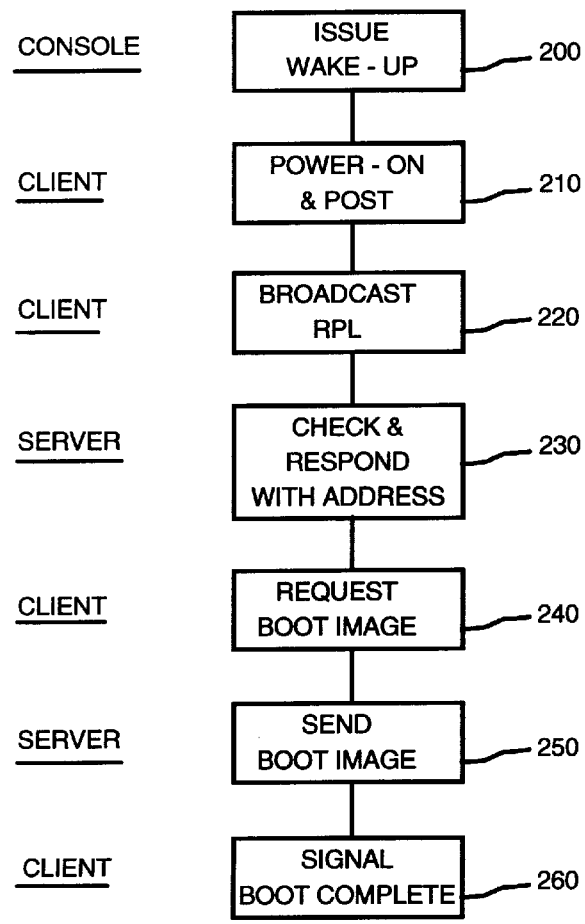
FIG. 4 is a flow chart showing the steps involved in the wake-up and remote boot of a client system in the network.

Next will be described, with reference to FIG. 4, the process by which a client system is woken-up and made operational using Wake-on-LAN.

A controlling system which may be constituted as a process executing on the server system or by a separate console system, executes a wake-up process to issue a wake-up frame (step 200) on the network which is either a broadcast frame for action by every Wake-on-LAN enabled client or alternatively is addressed to a specific client. On receipt of a suitably-addressed wake-up frame, the client is woken-up as described above.

In the conventional manner, the client then executes a number of self-test functions as defined by power-on self test code stored within the system ROM (step 210). Once the POST routines are complete, the system BIOS causes the client to invoke RPL code stored in ROM on the client's network adapter card. This RPL code, executing on the client system processor causes the client to broadcast RPL requests onto the network (step 220), the RPL requests specifying at least the network address of the client, which address is burned into adapter ROM during manufacture. The RPL code additionally opens a Service Access Point (SAP) at the client through which responses are received during the boot process.

The RPL request is then received by the one or more servers (which may be the same as the server issuing the wake-up frame) executing a process which compares the network address of the client against a locally stored list of known clients. If the comparison indicates that the server is responsible, it responds (step 230) by sending a reply to the client directly using the client address specified in the RPL request. This reply specifies the network address of the responding server. The client then requests (step 240) the software image from the server which responds (step 250) by sending the software image to the client for temporary storage in volatile memory. The client then executes the software image which may be either an operating system and application software for the client's intended function, or a bootstrap program that causes the client to load its operating system from its local storage.

Once the client's operating system and working software are loaded and ready for the user, the client may run a communications program (downloaded from the server) which tells the controlling system that the load is complete (step 260), so that the controlling system can check its target time is being met, allowing it to adjust its schedules to meet changing conditions.

The RPL process itself is well known and is described for example in the IBM Token-Ring Network Remote Program Load User's Guide version 1.0 SK2T-0333-01.

Thus is provided a remote-boot network in which a controlling system (i.e. the server or console system) is configured to wake one or more client systems on the network, which client systems then boot from the server system. Next will be described the manner in which this arrangement is enhanced to provide for reduced network loading by waking up the client systems according to a schedule either defined by the system administrator or alternatively calculated by the controlling system. The wake-up scheduling process according to the present invention is preferably implemented as software code executing on the server computer or on the console system, providing a user interface to the network administrator to allow him to configure and control the network in the manner to be described below.

In the simplest arrangement according to the present invention, the controlling system computer 20 (be it the server system or the console system) is programmed in RAM 124, of FIG. 2 with a schedule for waking up each client computer at the start of the working day. This schedule is defined by the system administrator and may be based on knowledge of when each client user typically turns on his/her client system at the beginning of the working day. Alternatively, the schedule can simply arrange for the sequential waking-up of each client so that every client is operational before say 8:00 a.m.

Figure 5:
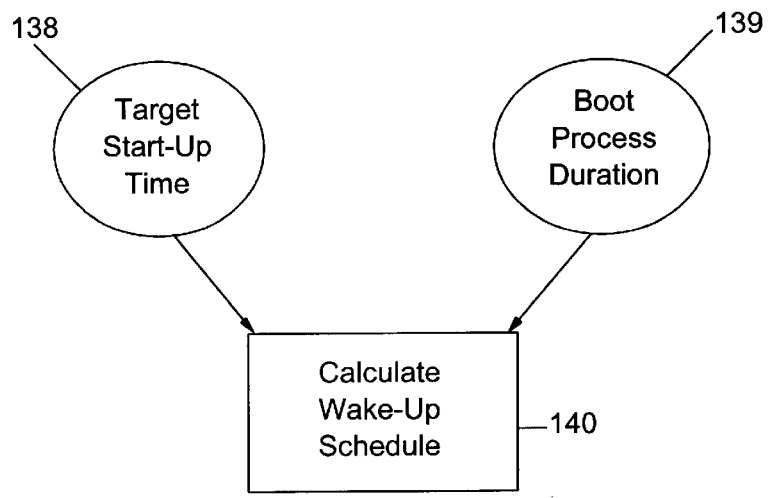
FIG. 5 shows an architectural schematic of the main components of the program of wake-up scheduling and control which is loaded in RAM of the controlling computer 20 of FIG. 2.

In a more complex implementation shown in FIG. 5, the list of client systems held by the controlling computer contains a target time 138 for each client to be available (based on data entered by the system administrator) and an expected process time 139 between activating the client and its becoming operational. The wake-up schedule software 140 on the controlling system then calculates a schedule for booting the client systems in sequence.

Figure 6:
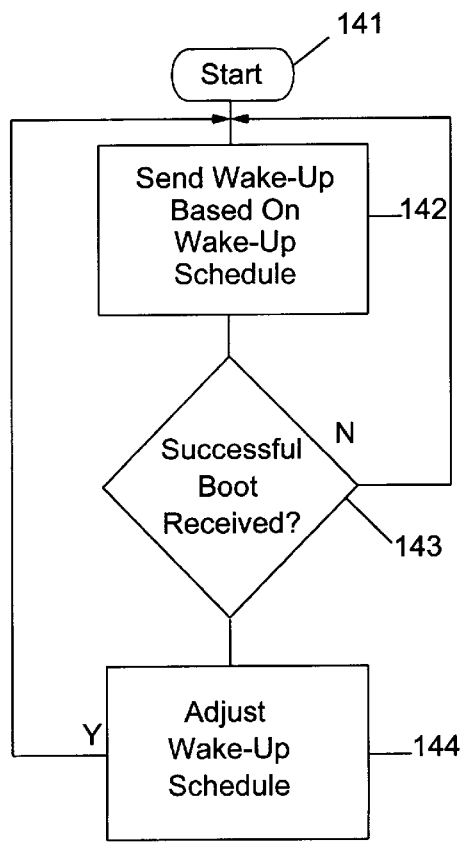
FIG. 6 shows a programming flowchart of steps to be loaded in RAM of computer 20 to achieve an enhancement of the wake-up process in FIG. 5.

In one preferred embodiment as shown in FIG. 6, the foregoing arrangements can be further enhanced by configuring the wake-up schedule process 140 to detect successful completion of the boot process 143 for each machine and to adjust the schedule 144 to compensate for changing conditions on the network, as for example when further clients are added, or start times are modified. The process then adjusts the schedule to minimise the total power-on time whilst ensuring that all of the clients are available when required.

The wake-up scheduling technique described above is capable of further adaptation to handle changes in network configuration e.g. by addition of further client systems into the network. Obviously, if further client systems are added, the network administrator could simply add details of the new clients into the wake-up schedule. Alternatively, the wake-up scheduling program can be arranged to automatically add new clients into the schedule. This is achieved as follows:

When a new remote-boot client is added to the network and is powered-on, the client issues RPL requests onto the network. Because these RPL requests are broadcast onto the network, they are received not only by the server system(s) but also by the controlling computer (server or console). In this way, the controlling computer is made aware when remote booting clients have commenced their boot process. The controlling computer makes a record of when RPL requests are received from such clients. As the RPL request includes the network address of the client, the controlling computer is able, over time, to learn when a particular client system user normally powers-on their computer. After a period of time (which can be set by the administrator and which may typically be between one day and one week), the controlling computer has sufficient data to know when it should schedule the wake-up for each client so that each client is powered-on ready for the user to start work each morning. In this manner, when the network is initially set up, the scheduling of client systems can be set automatically without the need for the network administrator to manually enter the address and power-on time. When new client systems are added to the network, they too will be automatically included in the schedule. Since Wake-on-LAN is a function of the network adapter, it is possible to tell from the adapter address whether or not a client is Wake-on-LAN enabled and therefore whether or not it should be sent a wake-up request.

Figure 7:
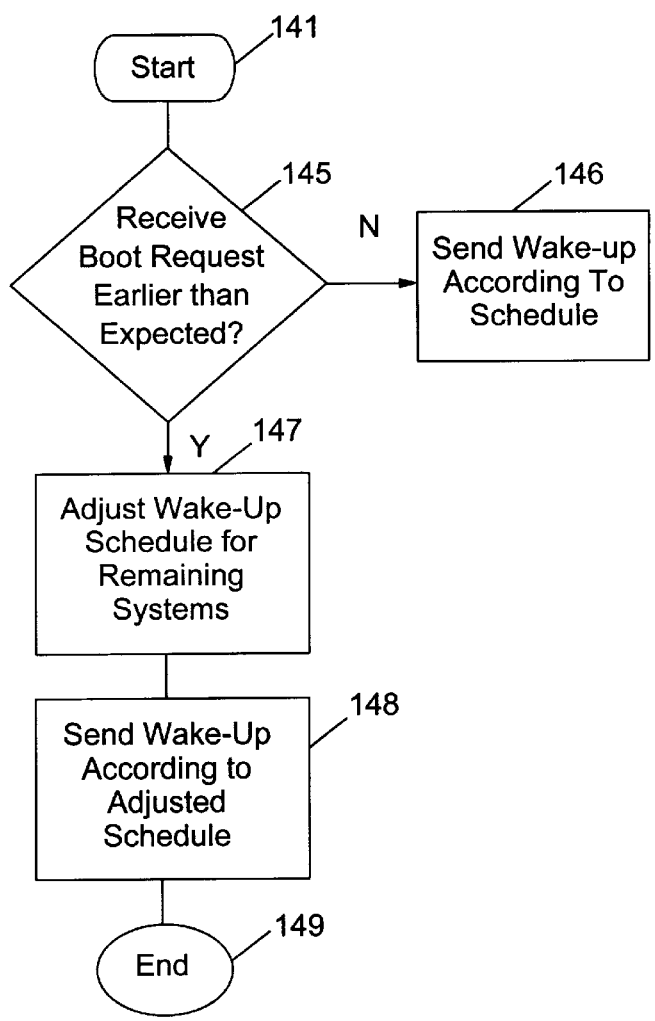
FIG. 7 shows a schematic process flowchart of steps to be loaded in RAM of computer 20 to achieve still further enhancements of the wake-up process of FIGS. 5 or 6.

As has been described, the wake-up schedule program in RAM 124 executing on the controlling computer 20 is operable to wake-up each enabled client prior to the time when the client user starts work see FIG. 5 for further details. However, the client user may wish to start work earlier than the time scheduled by the controlling computer, in which case the client, on power-up, will broadcast RPL requests onto the network. Depending on the time of day, these RPL requests may conflict with the wake-up schedule currently underway. Thus, the client system may still be booting from the server at the same time as another client is scheduled to be woken-up. Such a conflict could result in excessive network traffic which, in the worst case, could result in an endless timeout-retry cycle with neither of the client systems managing to boot successfully. Thus in accordance with a further preferred feature of the present invention as illustrated in FIG. 7, the wake-up scheduling program 140 executing on the controlling computer 20 is designed to delay the scheduled wake-up of other clients by a predetermined amount of time in response to the receipt of a non-scheduled RPL broadcast from a client before its scheduled wake-up time. The length of the predetermined delay may be set by the system administrator based on the typical amount of time required for a client system to boot over the network.

Similarly, if the network includes client systems which are not Wake-on-LAN enabled and which are therefore not included in the wake-up schedule, the controlling computer can be configured to automatically alter the schedule on receipt of an RPL broadcast from a non-enabled client. To further enhance this feature, the controlling computer wake-up scheduling program can be arranged to learn when non-enabled clients usually issue their boot broadcasts and can therefore make an adjustment to the wake-up schedule to avoid future conflicts.

Although in the foregoing, the described client systems have been configured to remote boot according to the RPL boot protocol, it will be appreciated that the present invention is also applicable to networks in which the clients boot according to other boot protocols such as BOOTP. The BOOTP process is described in RFC 951 "BOOTSTRAP PROTOCOL (BOOTP)", September 1985 published by the Network Working Group.

What is claimed is:

1. A data processing network comprising a plurality of client systems and a controlling system including control means for issuing wake-up requests to the client systems to cause the client systems to issue boot requests onto the network for servicing by a connected server system, the controlling system control means issuing the wake-up requests in accordance with a wake-up schedule calculated, for each client, to complete the boot process for that client before a target start-up time when a client user wishes to use the client system.

2. A data processing network as claimed in claim 1, the controlling system control means including means for calculating the wake-up schedule for the client systems from the target start-up time and the expected duration of the boot process for each client system.

3. A data processing network as claimed in claim 2 wherein the target start-up time used for each client is based on knowledge of when a user of the client has previously powered-on the client system.

4. A data processing network as claimed in claim 1, the controlling system control means including means responsive to a notification from a client system of a successful completion of the boot process for the client to dynamically alter the wake-up schedule for the client systems remaining to be woken up.

5. A data processing network as claimed in claim 1 comprising a further client system which is not initially included in the wake-up schedule of the controlling system, the controlling system control means including means responsive to boot requests from the further client system to compile data relating to the typical time that the further client system issues a boot request and thereafter to add the further client system to the wake-up schedule with a target time prior to the typical time.

6. A data processing network as claimed in claim 1 wherein the controlling system control means includes means responsive to a boot request from one of the client systems at a time earlier than that defined in the wake-up schedule for that client to dynamically adjust the wake-up schedule for the remaining client systems.

7. A data processing network as claimed in claim 6, wherein the wake-up schedule is dynamically adjusted by delaying the scheduled wake-up time for the other clients by an amount related to the typical amount of time required to boot a client system.

8. A data processing network as claimed in claim 1 wherein the controlling system forms part of the server system from which the client systems boot.

9. A data processing network as claimed in claim 1 wherein the wake-up request is a Wake-on-LAN frame and each client system includes a network interface card operable, on receipt of a Wake-on-LAN frame, to power-on the client system.

10. A data processing system for controlling the operation of a network of client computer systems connected thereto, comprising control means operable to issue wake-up requests to the client systems to cause the client systems to issue boot requests onto the network for servicing by a connected server system, said control means including means for calculating a wake-up time, for each client, to allow completion of the boot process for that client before a target start-up time when a client user wishes to use the client system.

11. A method of operating a data processing network comprising a plurality of client systems connected to a server system, comprising: issuing a wake-up request to one or more of the client systems to cause the client systems to issue boot requests onto the network for servicing by the server system, the wake-up requests being issued in accordance with a wake-up schedule calculated, for each client, to complete the boot process for that client before a target start-up time when a client user wishes to use the client system.

12. A computer program product comprising: a computer usable medium having computer readable program code means embodied in said medium for controlling the operation of a plurality of client computer systems in a data processing network, the computer readable program code means comprising:

computer readable program code means for issuing wake-up requests to the client systems to cause the client systems to issue boot requests onto the network for servicing by a connected server system; and computer readable program code means for calculating a wake-up time, for each client, to allow completion of the boot process for that client before a target start-up time.

* * * * *